United States Patent
Gordo et al.

(10) Patent No.: US 9,079,150 B2
(45) Date of Patent: Jul. 14, 2015

(54) OBJECT AUTHENTICATION METHOD AND USE THEROF

(75) Inventors: Manuel Arruebo Gordo, Zaragoza (ES); Clara Yagüe Gómez, Zaragoza (ES); Jesús Santamaría Ramiro, Zaragoza (ES)

(73) Assignee: UNIVERSIDAD DE ZARAGOZA, Zaragoza (ES)

( * ) Notice: Subject to any disclaimer, the term of this patent is extended or adjusted under 35 U.S.C. 154(b) by 0 days.

(21) Appl. No.: 13/502,603

(22) PCT Filed: Oct. 14, 2010

(86) PCT No.: PCT/ES2010/000415
§ 371 (c)(1),
(2), (4) Date: May 17, 2012

(87) PCT Pub. No.: WO2011/061359
PCT Pub. Date: May 26, 2011

(65) Prior Publication Data
US 2012/0217394 A1    Aug. 30, 2012

(30) Foreign Application Priority Data

Oct. 19, 2009   (ES) .................................. 200930865

(51) Int. Cl.
*B41M 3/14*    (2006.01)
*B44F 1/12*    (2006.01)
*B01J 13/02*   (2006.01)
(Continued)

(52) U.S. Cl.
CPC .................. *B01J 13/02* (2013.01); *B82Y 30/00* (2013.01); *G07D 7/122* (2013.01)

(58) Field of Classification Search
CPC .......... B01J 13/02; B82Y 30/00; G01D 7/122
USPC ............................................................. 427/7
See application file for complete search history.

(56) References Cited

U.S. PATENT DOCUMENTS

| | | | |
|---|---|---|---|
| 6,344,272 | B1 | 2/2002 | Oldenburg et al. |
| 6,530,944 | B2 | 3/2003 | West et al. |
| 7,144,627 | B2 | 12/2006 | Halas et al. |

(Continued)

FOREIGN PATENT DOCUMENTS

| | | |
|---|---|---|
| DE | 10 2007 061979 | 6/2009 |
| EP | 1 646 057 | 4/2006 |

(Continued)

OTHER PUBLICATIONS

Kah et al. Synthesis of gold nanoshells based on the deposition precipitation process, 2008, Gold Bulletin, 41(1), pp. 23-36.*

(Continued)

*Primary Examiner* — Kelly M Gambetta
(74) *Attorney, Agent, or Firm* — Arent Fox LLP

(57) ABSTRACT

An identification and verification system and a process for said identification and verification of documents is disclosed, which is based on the use of nanoparticles embedded or adsorbed in the document support, utilizing the different optical reflectance characteristics thereof in order to obtain, by combining several nanoparticles with specific characteristics, a high effectiveness in the identification of counterfeits.

13 Claims, 2 Drawing Sheets

(51) Int. Cl.
  *B82Y 30/00* (2011.01)
  *G07D 7/12* (2006.01)

(56) References Cited

U.S. PATENT DOCUMENTS

| | | |
|---|---|---|
| 7,371,457 B2 | 5/2008 | Oldenburg et al. |
| 8,497,131 B2 * | 7/2013 | Natan et al. ............... 436/56 |
| 2002/0103517 A1 | 8/2002 | West et al. |
| 2002/0187347 A1 | 12/2002 | Halas et al. |
| 2004/0214001 A1 | 10/2004 | Oldenburg et al. |
| 2005/0276906 A1 * | 12/2005 | Metzger ............................ 427/7 |
| 2007/0165209 A1 * | 7/2007 | Natan et al. ...................... 356/71 |
| 2010/0307705 A1 | 12/2010 | Rahm et al. |

FOREIGN PATENT DOCUMENTS

| | | |
|---|---|---|
| WO | WO 2009/117124 A1 | 9/2009 |
| WO | WO 2009117124 A1 * | 9/2009 |

OTHER PUBLICATIONS

International Search Report dated Apr. 27 issued in corresponding international patent applcation No. PCT/ES2010/000415.

* cited by examiner

OBJECT AUTHENTICATION METHOD AND USE THEROF

CROSS-REFERENCE TO RELATED APPLICATIONS

The present application is a 35 U.S.C. §§371 national phase conversion of PCT/ES2010/000415, filed Oct. 14, 2010, which claims priority of Spanish Application No. P200930865, filed Oct. 19, 2009, the contents of which are incorporated by reference herein. The PCT International Application was published in the Spanish language.

OBJECT OF THE INVENTION

The present invention relates to a system and a method for identifying documents or any another paper supports, such as paper money, equipment, consumption goods or other supports such as liquids.

The object of the invention involves a system and a method for identifying and verifying a number of markers made up of embedded nanoparticles or nanoparticles that form a coating on the support.

BACKGROUND OF THE INVENTION

Amongst the previous uses given to nanoparticles composed of a dielectric nucleus and a metal shell, different research groups worldwide have used them in medicine for the thermal ablation of tumour cells: they are injected in a tumour and a laser in the near-infrared region (NIR), with the wavelength whereat the particles are absorbed and diffracted, is externally applied; the particles are heated, resulting in the death of the tumour tissue due to temperature elevation, as reflected in patents US2002103517-A1 and U.S. Pat. No. 6,530,944-B2, and in several popular science documents.

Some types of nanoparticles have also been patented as filling material for paints, to obtain thermal insulation paints, as disclosed in U.S. Pat. No. 6,344,272-B1 held by UNIV RICE WILLIAM MARSH.

Also well-known are their plasmon optical resonance properties, which make them of interest to be used as contrast agents in medical .imaging (by means of photoacoustic tomography), and their use is disclosed in various documents, such as patents US2002187347-A1 and U.S. Pat. No. 7,144,627-B2. They have also been used to activate an optically activated sensor in patents US2004214001-A1 and U.S. Pat. No. 7,371,457-B2.

Other similar applications also consider the use of nanoparticles as optically activated valves; this use is reflected in documents such as Optically controlled valves for microfluidics devices. Sershen, S R., Ng, M. A., Halas, N. J., Beebe, D., West, J. L. Advanced Materials, 17 (2005): 1366-1368.

Currently, there are other inorganic nanoparticles the use whereof is aimed at optical labelling. However, these nanoparticles are based on carbon (e.g. carbon nanotubes) or quantum dots (semiconductor nanostructures that confine the movement, in the three spatial directions, of conduction band electrons, valence band gaps or excitons (binding pairs of conduction band electrons and valence band gaps, CdSe, CdS, CdTe, etc.)) (e.g. ©Evident Technologies, Inc.). Said materials emit at a single wavelength within the near-infrared region.

Invention patent US20070165209 discloses a method and a device for applying security labels or identifiers to documents or banknotes in order to prevent the counterfeiting thereof. Said identifiers may have the form of nanolabels, which may be Raman-active metal nanoparticles.

More specifically, gold nanoparticles may heat an area of up to 1000 times their size when they are excited with a laser of a given wavelength. Said property has been used to produce the photothermal ablation of tumours in vitro and in vivo, as previously mentioned. These nanoparticles are formed by a dielectric nucleus (silica) and a shell made of gold or any other noble metal (i.e. silver, platinum, copper). By changing the relative dimensions between the materials that make up the nucleus and the shell, it is possible to modify the properties of the resonant plasmon (wavelength of optimal optical extinction) of gold, causing them to absorb light in the near-infrared region (NIR). This near-infrared region (between 800 and 1200 nm) is of interest in biomedical applications, since tissues are transparent in said region, and do not absorb light from the incident beam. It is the so-called "water window". Thus, if a tissue is irradiated with any laser of a wavelength within that range, the temperature of said tissue will not rise. However, if the tissue is infiltrated with gold/silica nanoparticles, the application of a laser in the area would cause cell death by hyperthermia. Some authors have studied the effect .of different nanoparticle geometries and shapes/thicknesses on the absorption of IR radiation, but always from the standpoint of biomedical use, in phototherapy and thermal ablation.

DESCRIPTION OF THE INVENTION

A system is proposed for the authentication of various objects (identification documents, banknotes, paper money, luxury item labels, etc.), which is based on the use of nanoparticles that have a characteristic radiation absorption pattern in the near-infrared region (NIR). To this end, hybrid nanoparticles have been synthesised, composed of a dielectric nucleus made of silica and coated with a layer of gold, which present absorption patterns that may be modified as a function of the dimensions of the dielectric nucleus and the thickness of the metal layer. A given combination of dimensions provides a defined absorbance at a given wavelength (e.g. 808 nm) and at no other region of the spectrum.

Moreover, in that region of the spectrum, called "water window", few materials absorb light. I.e., below this region of the spectrum (between 800 and 1200 nm), light is absorbed by materials carrying chromophores, and, above this region, it is absorbed by materials containing water. For example, if we apply laser radiation of a wavelength within this region between 800 and 1200 nm to our skin, our skin and our bones would not absorb it and would be transparent thereto, as previously mentioned. This is obviously of great interest in medical applications: as discussed in the preceding section, and, for this reason, many works have attempted to develop this type of nanoparticles for various biomedical scenarios (cell labelling, hyperthermia, etc.), where the particles act as radiation targets.

The application of the object of the invention is clearly different; in this invention, the nanoparticles composed of a dielectric nucleus and a metal shell are used to authenticate objects whereto the aforementioned nanoparticles have been incorporated, since said nanoparticles absorb in this NIR region and absorb exclusively at a given wavelength. The practical interest and the advantages thereof are evident, since these particles are highly sophisticated and their manufacturing is beyond the reach of most research laboratories, and, of course, counterfeiters; nonetheless, they may be manufactured at a low cost; given their nanometric size, they are invisible to the eye and .even to optical microscopes; they do not change the essential properties of the material; they provide a means of authentication based on easy-to-read properties (light absorption at a given wavelength, supplemented, when applicable, with magnetic measurements); they may be easily introduced in both paper-based materials (e.g. cellulose, cotton, linen, etc.) and textile fibres and polymers; they may be dispersed in a liquid to be used as ink; unlike other nanoparticle-based systems, which usually work with fixed absorption characteristics for a given system, the system proposed in this invention presents high flexibility in its light absorption configuration, and an infinite number of absorbance patterns are possible, depending on the characteristics of the nanoparticles used.

A first embodiment of the object of the invention proposes the use of a combination of these nanoparticles to obtain an optical label (and, if applicable, a magnetic label, if they are used combined with magnetic nanoparticles) which is characteristic and exclusive, in order to make it impossible to copy items that are labelled or embedded with said nanoparticles. This application is clearly different from those already known, since the nanoparticles composed of a dielectric nucleus and a metal shell disclosed in this invention are used to authenticate objects due to the fact that they absorb in this NIR region and absorb exclusively at a given wavelength.

Another embodiment of the object of the invention also proposes the possible use: of a combination of several types of nanoparticles to obtain an optical label (or, if applicable, a magnetic or a combined label) which is characteristic and exclusive, in order to make it practically impossible to copy items that are labelled or embedded with said nanoparticles; the ratio between the size of the nucleus and the size of the shell, to obtain optical tracks which are characteristic and exclusive, in order to prevent the counterfeiting not only of paper money, but also of equipment, high-value-added consumption goods, etc. In some embodiments, the present invention provides for a method able to authenticate fluids such as perfumes.

DESCRIPTION OF THE DRAWINGS

In order to complement the description being made and to contribute to a better understanding of the characteristics of the invention, in accordance with a preferred practical embodiment thereof, a set of drawings is attached to said description as an integral part thereof, wherein the following has been represented for illustrative, non-limiting purposes.

PREFERRED EMBODIMENT OF THE INVENTION

Figure 1:
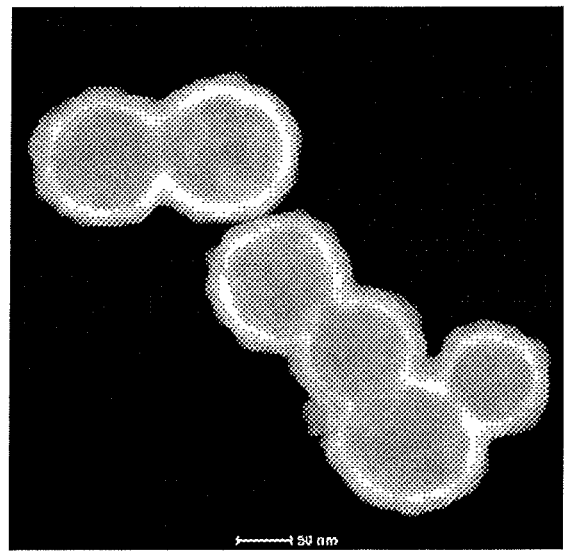
FIG. 1.—Shows a TEM image of the nanoparticles synthesised.

In light of the figures, below we describe a preferred embodiment of the process of this invention.

For the embodiment of the object of the invention, two types of silica/gold nanoparticles were synthesised, with different relative sizes, in order to obtain different absorption properties of the resonant plasmon thereof. To this end, classic wet chemistry techniques are used to synthesise the materials. The sol-gel technique is used for the dielectric nucleus made of silica, by means of the Stöber method, and seeding and secondary growth is used to obtain the gold shell in accordance with the method described by Oldenburg et al.

Thus, siliceous nanoparticles are obtained that are functionalised with amino groups in order to achieve the heterogeneous crystallisation, on the surface thereof, of gold particles (prepared separately) which grow to form layers of said material following successive regrowth steps with a gold precursor (chloroauric acid).

In some embodiments, the nucleus of the nanoparticles may be porous. In some embodiments, the nucleus of the nanoparticles may be adapted to house a third species inside the pores.

In some embodiments, the dielectric nucleus may be an inorganic oxide.

Examples of inorganic oxides include, but are not limited to, $SiO_2$ or $TiO_2$.

In some embodiments, the nanoparticles may form linear chains and/or multi-dimensional matrices.

In some embodiments, the nanoparticles may have a nanosphere, nanothread, nanorod, tetrahedral, and/or cube geometry.

Once obtained, the nanoparticles are characterised by means of:

Transmission electron microscopy, to determine the size of the nanoparticles. The Dual. Beam (Nova™ 200 Nano-Lab) equipment was used to distinguish the dielectric nucleus from the shell made of gold.

High-resolution transmission electron microscopy, to perform electron diffraction and corroborate the crystalline nature of the gold shell surrounding the amorphous silica nucleus. To this end, HRTEM equipment from TEI Instruments was used.

Nitrogen adsorption/desorption, to determine the specific surface area of the materials synthesised, by means of a Nitrogen adsorption equipment from Micromeritis.

Photon correlation spectroscopy, to determine the hydrodynamic size of the nanoparticles in dispersion in different media and at different pHs, in a Malvern Zeta Sizer 2000 equipment.

Thermogravimetry, to determine the quantity of amino groups on the surface prior to having the gold shell grow on the dielectric nuclei.

Atomic Absorption and Emission Analytical Spectrometry (ICP), to determine the elementary composition of the materials.

X-ray spectroscopy (XPS), to determine the atomic number of the elements that make up the surface of the nanoparticles, as well as the bonds found.

Fourier Transform Infra-red Spectroscopy (FTIR) in a catalytic chamber (DRIFT), to determine the bonds and interactions between the materials, and the coatings and functionalisations thereof.

UV-VIS-NIR spectroscopy, to evaluate the extinction coefficients and determine whether the nanoparticles synthesised absorb or disperse light within the near-infrared range, between 800 and 1200 nm.

Study of the reproducibility of the synthesis and the stability of the nanoparticles formed through time, under standard storage conditions in the presence and in the absence of light.

FIG. 1 shows the morphology of the nanoparticles synthesised.

Figure 2:
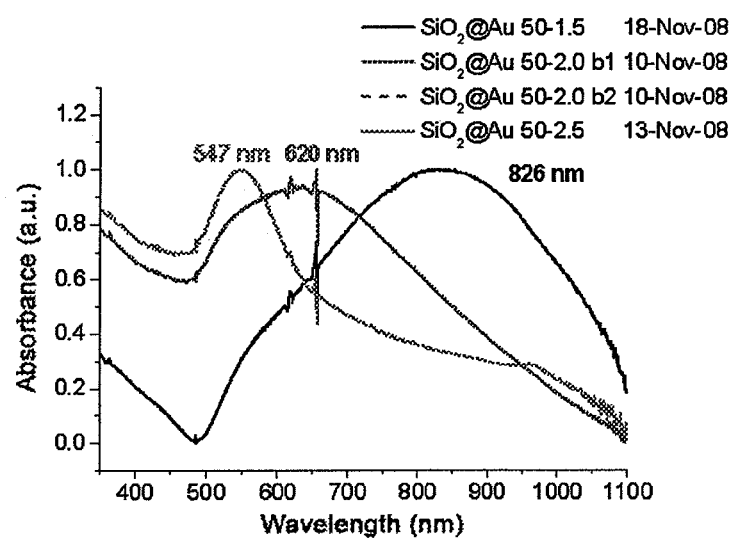
FIG. 2.—Shows an absorbance graph of silica/gold nanoparticles with a nucleus size of 50 nm and an absorbance maximum at 826 nm.
Figure 3:
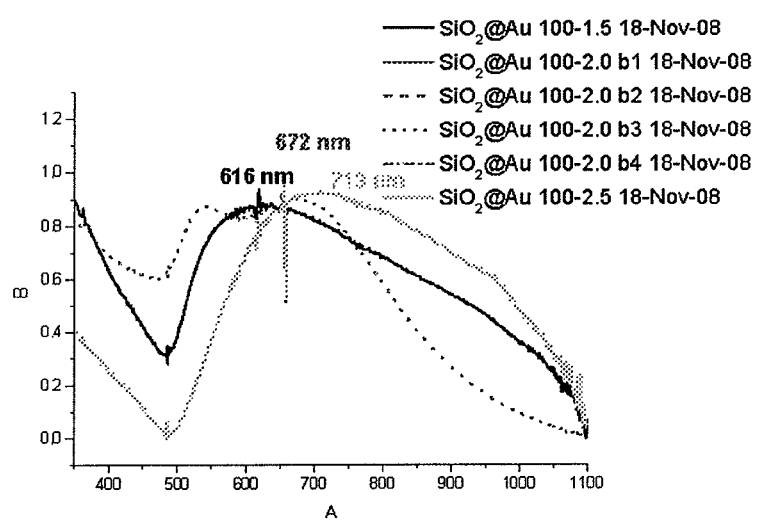
FIG. 3.—Shows an absorbance graph of silica/gold nanoparticles with a nucleus size of 100 nm and an absorbance maximum at 713 nm.

FIGS. 2 and 3 show how, by changing the proportions between the size of the nucleus and the size of the shell, absorption spectra in the near-infrared region are obtained which are characteristic of each nanoparticle.

The invention claimed is:
1. A method for authenticating objects using nanoparticles and a light source in the near-infrared region, the method comprising:
   a) synthesizing hybrid nanoparticles composed of a dielectric nucleus and a metal shell,
      wherein the nanoparticles present an absorption pattern in the near-infrared (NIR) region, and
      wherein the nucleus of the nanoparticles is porous and is adapted to house a third species inside the pores;
   b) adding magnetic nanoparticles which have a characteristic magnetic label to the hybrid nanoparticles;
   c) adding the nanoparticles of step b) to an object that is to be authenticated;
   d) applying light at a given wavelength in the NIR region and verifying the absorption by the nanoparticles of said light; and
   e) applying magnetic measurements to the nanoparticles to verify their magnetic label, consequently determining the authenticity of the object that is to be authenticated.

2. The method according to claim 1, further comprising:
characterizing the nanoparticles obtained in step b) by means of at least one of the following operations:
   determining the size of the nanoparticles by transmission electron microscopy; and
   validating the crystalline nature of the metal shell by means of high-resolution transmission electron microscopy using electron diffraction; and
   determining the specific surface area of the materials synthesized by means of nitrogen adsorption and desorption; and
   measuring the hydrodynamic size of the nanoparticles in dispersion in different media by means of photon correlation spectroscopy; and
   measuring the quantity of amino groups on the surface prior to having the metal shell grow on the dielectric nuclei by means of thermogravimetry; and
   determining the elementary composition of the materials by means of atomic absorption and emission analytical spectrometry; and
   measuring the atomic number of the elements that make up the surface of the nanoparticles, as well as the bonds found, by means of X-ray spectroscopy; and
   determining the bonds and interactions between the materials, and the coatings and fictionalizations thereof, by means of Fourier transform infra-red spectroscopy in a catalytic chamber; and
   evaluating the extinction coefficients by means of UV-VIS-NIR spectroscopy; and
   determining the magnetic label of the magnetic nanoparticles.

3. The method according to claim 1, wherein the addition of the nanoparticles to an object comprises dispersing said nanoparticles in a liquid to be used as ink.

4. The method according to claim 1, wherein the metal shell is made of gold; and
   step a) comprises:
   synthesizing the dielectric nuclei by means of a sol-gel technique and of the gold shell by means of seeding and secondary growth,
   functionalizing amino groups in order to produce covalent bonds between the gold nanoparticles synthesized separately and the nuclei,
   growing a layer of gold by means of regrowth with a gold precursor, in order to define the metal shell, thereby making a nanoparticle.

5. The method according to claim 4, wherein the gold precursor is chloroauric acid.

6. The method according to claim 1, wherein the dielectric nucleus is an inorganic oxide, and the metal shell is made of a metal selected from: gold, silver, platinum and copper.

7. The method according to claim 6, wherein the inorganic oxide of the nucleus is $SiO_2$ or $TiO_2$.

8. The method according to claim 1, further comprising:
   defining a specific absorbance pattern, which involves a combination of nanoparticles with different dimensions of the nucleus and the metal shell, as well as different natures of the materials that make up said nucleus and said metal shell.

9. The method according to claim 1, wherein the nanoparticles form linear chains or multi-dimensional matrices.

10. The method according to claim 1, wherein the nanoparticles have a geometry that is selected from: nanospheres, nanothreads, nanorods, tetrahedral, and cubes.

11. The method according to claim 1, wherein the object is paper money.

12. The method according to claim 1, wherein the object is a document.

13. The method according to claim 1, wherein the object is perfume.

* * * * *

UNITED STATES PATENT AND TRADEMARK OFFICE
CERTIFICATE OF CORRECTION

PATENT NO. : 9,079,150 B2  
APPLICATION NO. : 13/502603  
DATED : July 14, 2015  
INVENTOR(S) : Manuel Arruebo Gordo Page 1 of 1

It is certified that error appears in the above-identified patent and that said Letters Patent is hereby corrected as shown below:

On the Title Page

Foreign Application Priority Data reads:

(30)   Foreign Application Priority Data
   Oct. 19, 2009 (ES) ................................ 200930865

Foreign Application Priority Data should read:

(30)   Foreign Application Priority Data
   Oct. 19, 2009 (ES) ................................ P200930865

Signed and Sealed this
Twenty-fourth Day of November, 2015

Michelle K. Lee
*Director of the United States Patent and Trademark Office*